June 24, 1930.                H. A. CUMFER                1,766,982
                          PLASTER RECEIVING BOARD
                            Filed Jan. 30, 1928
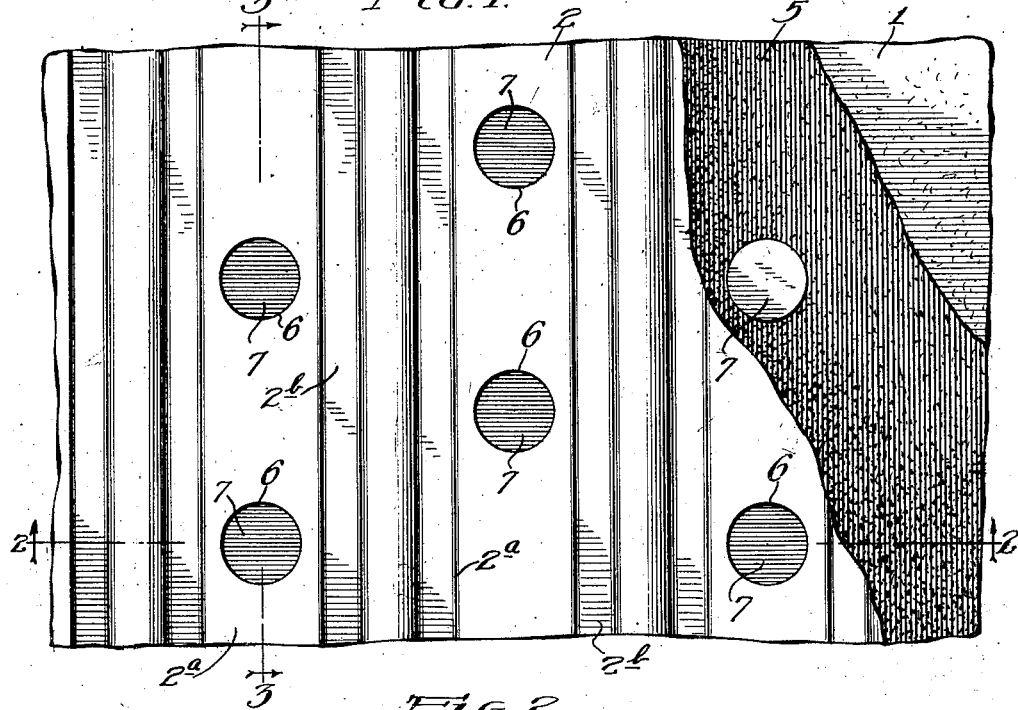
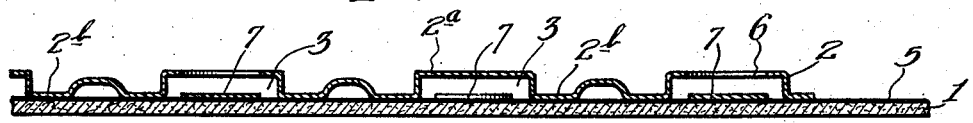
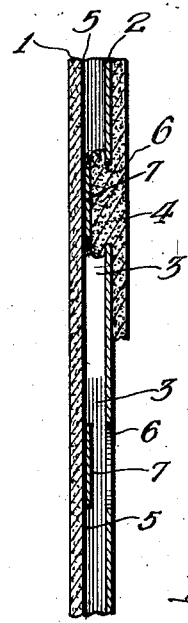
Witness:
Inventor:
Harry A. Cumfer,
By Frank L. Belknap
Atty.

Patented June 24, 1930

1,766,982

UNITED STATES PATENT OFFICE

HARRY A. CUMFER, OF CHICAGO, ILLINOIS, ASSIGNOR OF ONE-HALF TO WILLARD J. MASON, OF GREENWICH, CONNECTICUT

PLASTER-RECEIVING BOARD

Application filed January 30, 1928. Serial No. 250,374.

It is a principal object of the present invention to provide improvements in plaster receiving board made by adhesively uniting sheets of material, such as paper, one of which sheets constitutes the flat base sheet while the other is formed into alternate channels and ridges, the lower faces of the channels being adhesively united to the flat base sheet, the ridges having perforations in the crest thereof adapted to permit plaster to be keyed thereto.

In the manufacture of the type of board of the present invention the base sheet is coated with asphalt or other suitable waterproofing material having adhesive qualities to render the base sheet impervious to moisture and at the same time permit the channelled and ridged sheet to be adhesively united to the base sheet. Such adhesive waterproofing materials, for instance, asphalt, ordinarily are of such a nature that plastic material such as plaster does not adhere thereto. Thus, the plastic material entering through the perforations of the channelled and ridged sheet will not adhere to the base sheet because of the coating of waterproofing adhesive material thereon.

A specific object of the present invention comprises the step of causing this plastic material to bond with the base sheet and the manner in which this is accomplished possesses many points of novelty over the prior art.

In one of the preferred modes of accomplishing this object, the severed waste portions, or cut outs produced in making the perforations in the channelled and ridged sheet, are adhesively attached to the base sheet to provide a means for bonding the plastic material thereto. It is well known that felted fibers possess a certain amount of ability to absorb, and it is obvious, therefore, that when these cut outs, which comprise felted fibers, are pasted to the base sheet they function to key or bond the plastic material thereto, having in mind that the upper surface of the cut out does not contain any substantial quantity of waterproofing material. The plaster, therefore, will be bonded to the upper and lower faces of the channelled and ridged sheet and also to the base sheet, thus making a firm and secure bond between the plaster and plaster board.

As a further feature of the present invention, by utilizing the severed cut outs for the purpose described, there is no waste produced in the making of the board. As a still further feature of the invention, these cut outs are pasted to the base sheet at points substantially opposite to the perforations, so that the plaster entering the perforations will make a bond with the base sheet through the medium of these pasted cut outs.

Other objects, features, and advantages will be more apparent from the following detailed description:

In the drawings, Fig. 1 is a fragmentary plan view of the board of the present invention with certain parts broken away for clearness.

Fig. 2 is a sectional view taken on line 2—2 of Fig. 1 looking in the direction of the arrows.

Fig. 3 is a sectional view taken on line 3—3 of Fig. 1, showing plastic material applied to the board and keyed by the perforations.

Referring more in detail to the drawings, the board of the present invention may comprise two sheets, a flat base sheet 1 and a ridged and channelled upper sheet 2. The base sheet 1 may comprise a multi-ply sheet of suitable thickness and strength, for instance, it may comprise a three-ply sheet having an inner ply of loosely felted material having good insulating and sound deadening qualities, to both surfaces of which are adhesively united plies, say of chip board, which are more closely felted and which possess substantially more rigidity and strength than the inner ply. It is to be understood that this is one illustration only of a type of base sheet 1 which will be found advantageous for use with the present invention as a base sheet, but I do not in any way wish to limit myself to this particular base sheet, as the invention in its broad aspects has no relation to any particular type of base sheet. In the drawings base sheet 1 is illustrated as being thicker than the upper sheet 2. I wish to point out that I do not wish to have the base sheet 1 thicker than the upper sheet 2, it may be of uniform thickness or it may be thicker than the base sheet 1.

The sheet 2 may be formed of one or more plies of suitable felted fibrous material, such as chip board, rag stock, or the like, and is provided with spaced ridges 2$^a$ and alternate channels 2$^b$ forming the closed pockets 3, the lower faces of the channelled portions 2$^b$ being adhesively united to the base sheet 1 by suitable adhesive material, illustrated by 5, which may comprise asphalt. The latter is a desirable material to use, since it not only has adhesive qualities, but also has properties of being water resistant. The upper surface of each ridge 2$^a$ may be provided with spaced perforations 6 to permit the plaster, designated 4, to enter the pockets 3 between the sheets 1 and 2, as is clearly shown in Fig. 3. By reference to Fig. 1 it will be noted that the perforations of adjacent ridges are staggered relative to each other for the obvious purpose of causing a more secure keying of the plaster.

In the manufacture of the composite board of the present invention the base sheet 1 may be coated with asphalt in heated liquid condition, and while the asphalt is in a more or less sticky or adhesive condition, the channelled sheet 2 may be applied thereto, with two sheets being held together until the asphalt has cooled sufficiently to bind them securely into a unitary structure.

As a feature of the present invention, the waste portions resulting from the formation of the perforations 6 may be applied to and adhesively united to the base sheet 1 through the medium of the material 5, preferably substantially in alignment with the perforation 6, whereby the plaster 4 may adhere to their surface (Fig. 3). The upper surface of the sheet 2 preferably does not contain any coating of waterproofing material, and therefore the cut out formed in the making of the perforations 6 when adhesively united to the base sheet presents an upper face which is substantially devoid of waterproofing material. The reason why the upper surface of the upper sheet contains no substantial coating of waterproofing material is because of the fact that in utilizing the board as plaster board, the plaster would not adhere to the surface of the waterproofing material, but a felted fibrous surface devoid of waterproofing material has an affinity for plastic material such as plaster. In view of the fact that the entire surface of the base sheet has been coated with waterproofing material, the plaster introduced into the pockets 3 through the perforation 6 would not form any kind of a bond with the base sheet due to the waterproofing material. It will be obvious, therefore, that the utilization of the cut outs 7 not only prevents any waste in manufacturing, but by adhesively uniting these cut outs to the base sheets, they serve as a means of bonding the plaster to the base sheet.

In addition, the utilization of these waste portions 7 for the purpose described also results in causing the plaster to more firmly bind the sheets 1 and 2 together as a unitary structure.

In the process of manufacture, the sheet 2 may be provided with the ridges 2$^a$ and alternate channels 2$^b$, spacing the ridges from each other, after which it may be applied to the base sheet. As part of a continuous operation, after the two sheets have been adhesively united together, the perforation 6 may be made in the ridges and the cut outs pasted to the base sheet by a controlled perforating and pressing operation. Or, the perforations may be made at the time the channels and ridges are formed in the sheet 2, it being only necessary that the sheet be scored sufficiently to permit the separation of the cut out from the perforation upon the application of suitable pressure, but without completely severing the cut out which would then drop out. The cut out could then be completely severed by an element which simultaneously punches the cut out along the scored line and applies it to the base sheet.

I have illustrated a board in which perforations are made only in the upper face of the upper sheet. It is to be understood, of course, that it is within the contemplation of the invention to make the perforations on any face of the ridges 2$^a$. It is also obvious that the perforations may take any shape or form other than a circle, and also that the invention is not to be limited to the utilization of the particular waste cut out from the particular perforation. For instance, it is within the contemplation of the invention to produce elongated perforations, into which can be inserted short severed strips of suitable fibrous material to perform the same functions as the waste cut outs.

I claim as my invention:

1. Built up board comprising a flat base sheet coated with an adhesive water resistant material, and a surface sheet united with said base sheet, said surface sheet being provided with alternate channels and ridges, said ridges being perforated to permit plastic material to pass therethrough, and elements adhesively united to the base sheet below said perforations presenting surfaces adapted to form a bond between said plastic substance and said base sheet.

2. A built up board comprising a flat base sheet of felted fibrous material having a coating of adhesive waterproofing material on one surface thereof, a second sheet adhesively united with a coated surface of said base sheet provided with a series of alternate channels and ridges to form spaced closed pockets, surfaces of said ridges being provided with spaced perforations, cut outs formed in producing said perforations being adhesively united to said base sheet within said pockets substantially directly opposite said perforations.

3. A built up board comprising a base sheet having a surface coated with an adhesive waterproofing material, and a second sheet being formed into a series of alternate channels and ridges, the lower faces of said channels being adhesively united to the coated surface of the base sheet, said ridges having perforations therein through which a plastic substance applied thereto keys therewith, and cut outs produced in forming said perforations adhesively united to the base sheet under the perforations, each presenting a surface adapted to form a bond between the plastic substance and the base sheet.

In testimony whereof I affix my signature.

HARRY A. CUMFER.